Dec. 30, 1969   D. E. WRIGHT   3,486,374
VOLUME MEASURING SYSTEM
Filed April 7, 1967
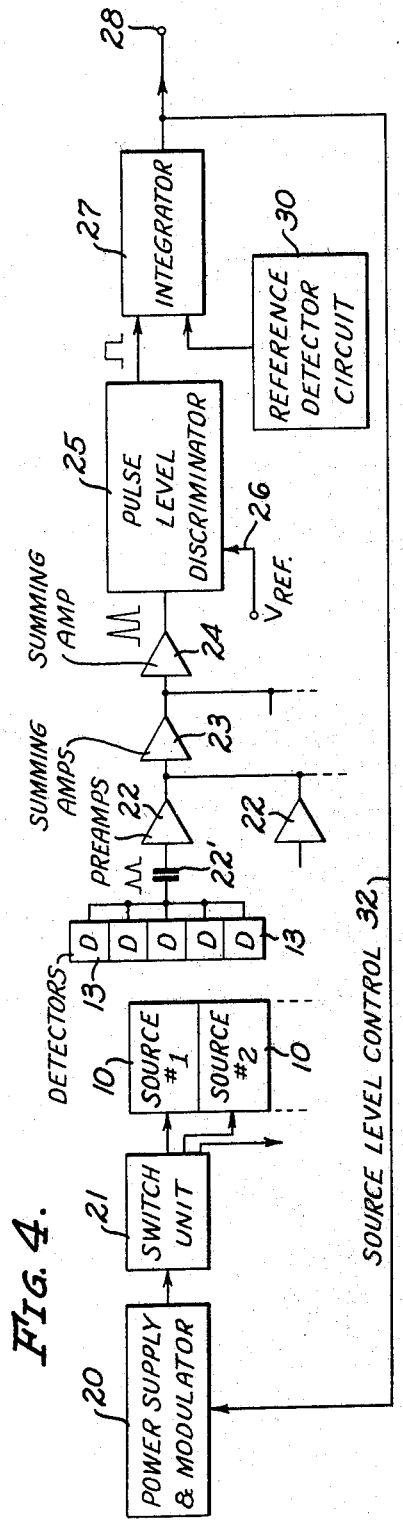
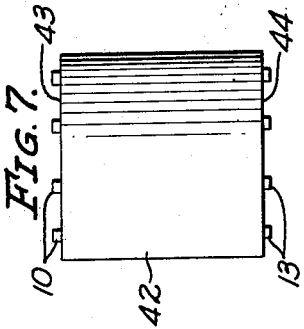
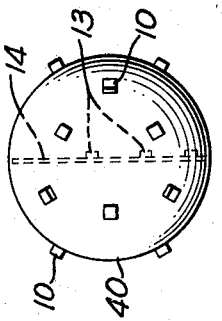
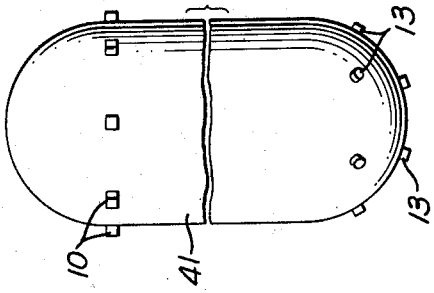
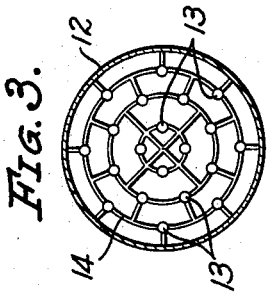
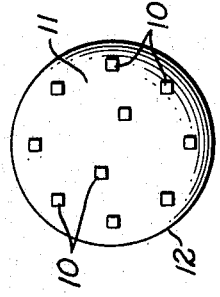
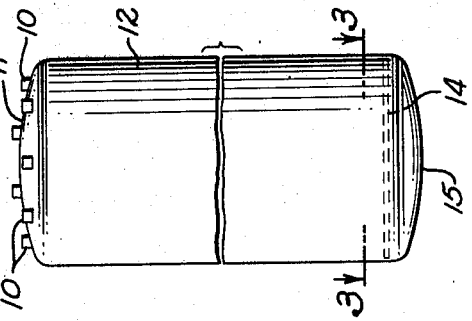
INVENTOR.
DONALD E. WRIGHT
BY HIS ATTORNEYS.
HARRIS, KIECH, RUSSELL & KERN United States Patent Office 3,486,374
Patented Dec. 30, 1969

3,486,374
VOLUME MEASURING SYSTEM
Donald E. Wright, Upland, Calif., assignor, by mesne assignments, to Tyco Laboratories, Inc., a corporation of Massachusetts
Filed Apr. 7, 1967, Ser. No. 629,165
Int. Cl. G01f 17/00
U.S. Cl. 73—149
11 Claims

ABSTRACT OF THE DISCLOSURE

A device for measuring the quantity of material in a container without regard to the location of the material comprises a plurality of radiation sources and detectors disposed about the container. Each source illuminates the detectors through at least portions of the container. The sources are sequentially activated. The outputs of the detectors are either analyzed individually or are summed to provide an indication of the quantity of material in the container.

---

This invention relates to apparatus for the measurement of quantity of material in a container, typically a fuel tank or an oil tank or the like. The gaging apparatus is particularly adapted for use with containers which may assume various orientations and which may be operated at accelerations and decelerations and under zero gravity conditions.

It is an object of the invention to provide an apparatus permitting direct measurement of the mass of material in the container and an apparatus which is not affected by the position or density variation of the material. A further object is to provide such an apparatus which is simple and reliable and which has very low power requirements and which is readily installed without requiring structural additions or modifications to the container itself. A particular object is to provide such an apparatus which may be installed, wholly or in part, externally of the container, on the container surface, and/or within the container.

It is an object of the invention to provide a gaging apparatus for a container which has high sensitivity near the empty container condition and an apparatus in which the power consumption can be reduced as the container contents are reduced. A further object is to provide such an apparatus wherein the effects of thermal noise, due to temperature variations, and space radiation effects may be directly compensated for and eliminated as sources of error.

It is an object of the invention to provide an apparatus for measuring quantity of a material in a container including a plurality of penetrating radiation sources spaced from each other and positioned relative to the container for directing radiation through at least portions of the container, a plurality of radiation detectors spaced from the sources for receiving radiation from the sources passing through at least portions of the container, and control means for sequentially turning radiation from the sources on and off so that radiation is directed toward the detectors from the sources in sequence. A further object is to provide such an apparatus wherein the outputs of the various detectors can be combined to provide an output signal varying as a function of the quantity of material within the container. An additional object is to provide such an apparatus wherein the outputs of the various detectors can be sampled individually to provide a plurality of density profiles through the container thereby providing an indication of the location of the material within the container.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:
FIG. 1 is a side view of a container with the apparatus of the invention installed thereon;
FIG. 2 is a top view of the container of FIG. 1;
FIG. 3 is a sectional view taken along the line 3—3 of FIG. 1;
FIG. 4 is an electrical block diagram of the apparatus of FIG. 1; and
FIGS. 5, 6 and 7 are views similar to that of FIG. 1 illustrating the application of the apparatus to various container forms.

Typically the gaging system of the invention may be utilized to provide a measure of the amount of liquid fuel or oil in a tank of a ship, aircraft or rocket engine and an example of this type will be described herein. Of course, the invention is readily applicable to a variety of containers, configurations and contents, including gaseous liquid, particulate and solid materials.

Prior art devices utilizing a source of penetrating radiation and a detector at opposing surfaces of a container are shown in U.S. Patents Nos. 2,830,183 and 2,952,774. These prior art devices exhibit a number of problems, particularly when used on large containers subject to high accelerations and decelerations and zero gravity conditions. Two of the problems resolved by the present system are those of accurate measurement independent of container orientation and position and amount of materials in the container, and power consumption. The latter is of particular importance with the larger containers.

Also, it is advantageous to use radiation sources with on-off capability rather than continuously emitting radiation sources for the larger containers to avoid safety handling, weight and cost problems associated with high strength penetrating radiation sources. Modulation of the source is used to improve signal-to-noise ratios and reduce power consumption and in addition, sequentially pulsing the sources is used to improve the measurement by essentially making many multiple density profiles through the tank (number of density samples=number of sources multiplied by number of detectors). If the source is continually emitting, stringent collimation of both sources and detectors is required to eliminate cross-talk. Therefore, only a limited number of narrow beam density profiles are obtained (number of density profiles=number of sources or detectors).

Referring now to FIGS. 1, 2 and 3, a plurality of radiation sources 10 is positioned on one end 11 of a container 12. In the particular embodiment illustrated, ten sources 10 are utilized, with the sources spaced from each other.

A plurality of radiation detectors 13 is mounted on a spider support 14 positioned within the container 12 adjacent an end 15 opposing the end 11. In the particular embodiment illustrated, the detectors are mounted in twenty groups, with five detectors in each group.

Each of the sources 10 is a source of penetrating radiation such as an X-ray tube or a radioactive material producing gamma rays such as Cs 137, Tm 270 or Am 243. The sources preferably are shielded so as to direct radiation only through the container toward the detectors 13. Means is provided for modulating or turning each of the sources on and off. With the radioactive material, the means could be a shield which is mounted for movement into and out of the path from the source to the detectors. But it is preferred to utilize an X-ray tube which is readily turned on and off electrically. Other sources of penetrating radiation include bremsstrahlung (isotope X-ray) sources with magnetic or electrostatic modulation, isotope light sources with magnetic, electrostatic or shutter modulation, visible, ultraviolet and infrared tubes or lamps with electrical or mechanical modulation, and radio frequency oscillators, including the microwave region with electrical or mechanical modulation. The choice of source will of course depend upon the characteristics of the material in the container.

The detectors 13 are conventional in nature and any of the presently available devices may be utilized, such as Geiger-Mueller tubes, scintillators, or solid state devices. The latter are preferred for most present applications.

The gaging system includes means for cyclically turning the sources on and off in sequence, typically having only one source on at a time. With the specific embodiment illustrated, when one source is on, the 100 detectors will provide 100 density profiles through the container. As each subsequent source is turned on, an additional 100 density profiles can be obtained, providing 1,000 density profiles across the container which can readily be crosscorrelated providing information on the location of the material within the container. Alternatively, the outputs from the detectors can be combined to provide a direct reading of the total mass of material within the container.

A preferred form of circuitry for use with the gaging system of the invention is illustrated in FIG. 4. The X-ray tube sources 10 are energized from a power supply and modulator 20 through a switch unit 21. The switch unit may be operated to cyclically turn each X-ray tube on in sequence.

Each group of five detectors 13 is connected to a preamplifier 22 through a coupling capacitor 22'. With the specific embodiment being described, the outputs of five preamplifiers 22 are connected to a summing amplifier 23, with four such summing amplifiers being utilized for the twenty groups. The outputs of the four summing amplifiers 23 are connected to another summing amplifier 24 and the output of this amplifier is connected to a pulse level discriminator 25. The choice of the number and arrangement of detectors and amplifiers will depend upon the particular application and is not critical to the invention.

The pulse level discriminator functions to discriminate between low level noise pulses and higher level pulses produced by the detectors as a result of radiation from the sources 10. The pulse level discriminator may also discriminate between the desired output pulses from the detectors and the very high level pulses produced by cosmic radiation. A reference voltage is provided to the discriminator on line 26 and the discriminator functions to produce an output pulse of a controlled magnitude and duration for each input pulse of a magnitude greater than that determined by the reference voltage. A second reference voltage may be utilized as a high level limit so that input pulses greater than a certain magnitude will not be transmitted. Pulse level discriminators are conventional and any of the presently known circuits may be utilized.

The output of the discriminator 25 is connected to an integrator 27 which in turn provides an output voltage varying in amplitude as a function of the rate at which input pulses are received. Therefore, the output voltage at terminal 28 will vary as a function of the radiation received at the detectors 13 and is a direct indication of the absorption of radiation from the sources 10 within the container and thereby a direct indication of the amount of material present in the container. The integrator circuit 27 is conventional in design and any of those presently available may be utilized.

A reference detector circuit 30 may be incorporated to eliminate the effects of detector-thermal noise, eletronics noise from temperature variations, and space radiation effects. The reference detector circuit 30 will incorporate a detector and associated circuitry identical to that utilized with the detectors 13, with the reference detector shielded from the sources 10. The output of the reference circuit may be combined in subtractive relation with that of the main circuit prior to integration, as illustrated in FIG. 4. Alternatively, the reference circuit may include an integrator, with the outputs of the two integrators being combined.

Absorption of radiation within the container is a maximum when the container is full, requiring maximum power from the sources at that time. As material is removed from the container, the radiation absorption decreases and the radiation intensity from the sources may be decreased without adversely affecting sensitivity of the overall system. This permits a marked saving in power consumption of the overall system. A feedback connection 32 is provided from the integrator output to the power supply and modulator 20 for reducing the output from the sources as the output from the integrator increases. Typically this may be accomplished by reducing the current in the X-ray tubes.

The gaging system permits inspection of all or most of the interior of the container, provides an output indication regardless of the location of the material within the container and at the same time, requires very little power with the sources being sequentially turned on and off. In a typical system, the sources may be switched on at a rate of 10 to 20 per second and the time constant of the integrator may be in the order of several seconds. The circuit illustrated in FIG. 4 provides an output at terminal 28 which is a measure of the total contents of the container. If desired, the outputs from each of the individual detectors can be sampled to provide individual density profiles through the container. This information may then be analyzed to provide a determination of the position of the material within the container.

As indicated above, the particular arrangement of the sources and detectors may be varied to suit the configuration of the container and the installation of the container. Several alternative arrangements are illustrated in FIGS. 5, 6 and 7. FIG. 5 illustrates a spherical container 40 having the sources 10 disposed on the outer surface and the detectors 13 carried on a spider 14 within the container. FIG. 6 illustrates an elongate container 41 with the sources 10 positioned in a circle adjacent one end and with the detectors 13 disposed on the surface of the container adjacent the opposite end. FIG. 7 illustrates a container 42 with flat ends 43, 44. The sources 10 are carried on the flat end 43 and the detectors 13 are carried on the flat end 44. Various other configurations and orientations will readily come to mind.

Although exemplary embodiments of the invention have been disclosed and discussed, it will be understood that other amplifications of the invention are possible and that the embodiments disclosed may be subjected to various changes, modifications and substitutions without necessarily departing from the spirit of the invention.

I claim as my invention:

1. In an apparatus for measuring quantity of a material in a container, the combination of:
    a plurality of penetrating radiation sources spaced from each other and positioned relative to the container for directing radiation through at least portions of the container;
    a plurality of radiation detectors spaced from said sources for receiving radiation from said sources passing through at least portions of the container; and
    control means for sequentially turning radiation from said sources on and off so that radiation is directed toward said detectors from said sources in sequence with the output of a detector providing an indication of the quantity of material in the path of said detector and a radiating source.

2. An apparatus as defined in claim 1 in which said sources comprise electrically energized tubes and said control means turns said tubes on one at a time.

3. An apparatus as defined in claim 1 in which each of said sources comprises a continuously radiating element with a movable shield and said control means includes for unshielding said sources one at a time.

4. An apparatus as defined in claim 1 including means responsive to the quantity of radiation received at said detectors for reducing the radiation of said sources as said received radiation increases.

5. An apparatus as defined in claim 1 in which said detectors are positioned within the container.

6. An apparatus as defined in claim 1 in which said sources are positioned adjacent a surface of the container and said detectors are positioned adjacent an opposing surface of the container.

7. An apparatus as defined in claim 1 in which said sources are positioned adjacent the surface of the container and said detectors are positioned within the container intermediate the sources.

8. An apparatus as defined in claim 1 including:
circuit means for combining the output pulses of said detectors; and
integrator means for integrating the combined pulses for providing an output signal varying in magnitude as a function of the pulse rate.

9. An apparatus as defined in claim 8 including a reference signal circuit comprising an additional detector shielded from said radiation sources, and means for combining the output of said additional detector with the output of said circuit means.

10. An apparatus as defined in claim 8 including discriminator means coupled between said combining means and said integrator means for rejecting pulses of predetermined magnitudes.

11. An apparatus as defined in claim 8 including:
modulator means for varying the output of said radiation sources as a function of a control signal; and
circuit means for connecting said output signal of said integrator means to said modulator means as the control signal whereby the radiation source output is reduced as the output signal tends to increase.

References Cited

UNITED STATES PATENTS

| | | | |
|---|---|---|---|
| 2,830,183 | 4/1958 | Wolfe | 250—43.5 |
| 2,952,774 | 9/1960 | Howard | 250—43.5 |
| 3,310,674 | 3/1967 | Brunton | 250—43.5 |

LOUIS R. PRINCE, Primary Examiner

M. J. NOLTON, Assistant Examiner

U.S. Cl. X.R.

250—43.5

PO-1050
(5/69)

UNITED STATES PATENT OFFICE
CERTIFICATE OF CORRECTION

Patent No. 3,486,374      Dated December 30, 1969

Inventor(s) Donald E. Wright

It is certified that error appears in the above-identified patent and that said Letters Patent are hereby corrected as shown below:

Column 1, Line 46 "thermal noise, due to" should read
--thermal noise, noise due to--
Page 3, line 2 of specification.

Column 2, Line 49, "or" should read --on--
Page 5, line 28 of specification.

Column 5, Claim 3, line 4 and 5 "includes for unshielding"
should read '"includes means for unshielding"
Claim 3, line 4 of specification.

SIGNED AND
SEALED
JUL 21 1970

(SEAL)
Attest:

Edward M. Fletcher, Jr.
Attesting Officer

WILLIAM E. SCHUYLER, JR.
Commissioner of Patents